(12) United States Patent
Armbruster et al.

(10) Patent No.: US 9,998,385 B2
(45) Date of Patent: *Jun. 12, 2018

(54) METHOD FOR OPERATING A COMMUNICATIONS NETWORK AND NETWORK ARRANGEMENT

(71) Applicant: SIEMENS AKTIENGESELLSCHAFT, München (DE)

(72) Inventors: Michael Armbruster, München (DE); Ludger Fiege, Grafing (DE); Johannes Riedl, Ergolding (DE); Thomas Schmid, Leinfelden-Echterdingen (DE); Andreas Zirkler, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 204 days.

This patent is subject to a terminal disclaimer.

(21) Appl. No.: 14/370,984

(22) PCT Filed: Sep. 28, 2012

(86) PCT No.: PCT/EP2012/069273
§ 371 (c)(1),
(2) Date: Jul. 8, 2014

(87) PCT Pub. No.: WO2013/104436
PCT Pub. Date: Jul. 18, 2013

(65) Prior Publication Data
US 2014/0328171 A1 Nov. 6, 2014

(30) Foreign Application Priority Data
Jan. 9, 2012 (DE) .................. 10 2012 000 185

(51) Int. Cl.
*H04L 12/801* (2013.01)
*H04L 12/939* (2013.01)
*H04L 12/413* (2006.01)

(52) U.S. Cl.
CPC ............ *H04L 47/29* (2013.01); *H04L 12/413* (2013.01); *H04L 49/55* (2013.01)

(58) Field of Classification Search
CPC ....... H04L 12/413; H04L 47/29; H04L 49/55; H04L 12/801
See application file for complete search history.

(56) References Cited

U.S. PATENT DOCUMENTS 9,680,735 B2 * 6/2017 Armbruster ....... H04L 12/40163
2006/0162986 A1 7/2006 Degoul
(Continued)

FOREIGN PATENT DOCUMENTS

CN 101023633 A 8/2007
EP 1548992 A1 6/2005
(Continued)

OTHER PUBLICATIONS

International Search Report; PCT/EP2012/069273; dated Sep. 28, 2012; Siemens Aktiengesellschaft; 2 pgs.
(Continued)

*Primary Examiner* — Andrew Chriss
*Assistant Examiner* — Voster Preval
(74) *Attorney, Agent, or Firm* — Schmeiser Olsen & Watts LLP

(57) ABSTRACT

A method for operating a communications network, in particular an Ethernet network is provided. Network devices that are coupled to the network have a switch device and a control device that is coupled to the switch device, and the switch device has at least one receiving port and a sending port for sending and receiving data via the communications network. Fuse devices for monitoring a particular data transfer rate are assigned to the receiving ports. The fuse devices block data reception at a particular receiving port when a previously determined maximum data transfer rate is exceeded. A possible annular structure using bidirectional communication paths and the limitation of the data transfer rate at the receiving ports improve fail-safety and error analysis in the event of transfer and hardware errors, in particular babbling idiot errors. The invention further relates (Continued)

to a network arrangement having a plurality of corresponding network devices which function according to said method.

19 Claims, 9 Drawing Sheets

(56) References Cited

U.S. PATENT DOCUMENTS

| | | | |
|---|---|---|---|
| 2007/0280106 A1* | 12/2007 | Lund | H04L 63/1408 |
| | | | 370/230 |
| 2007/0286075 A1 | 12/2007 | Shoham | |
| 2009/0122812 A1 | 5/2009 | Angelow | |
| 2010/0262689 A1* | 10/2010 | Ungermann | H04L 12/40032 |
| | | | 709/224 |
| 2011/0116508 A1* | 5/2011 | Kirrmann | H04L 12/437 |
| | | | 370/392 |

FOREIGN PATENT DOCUMENTS

| | | | |
|---|---|---|---|
| EP | 1705839 A1 * | 9/2006 | H04L 12/462 |
| EP | 2228723 A1 | 9/2010 | |
| JP | 2005354514 A | 12/2005 | |
| JP | 2007214796 A | 8/2007 | |
| JP | 2007525107 A | 8/2007 | |
| JP | 2008131137 A | 6/2008 | |
| WO | WO 2005053223 A2 | 6/2005 | |

OTHER PUBLICATIONS

Translation of Chinese Office Action for CN Application No. 201280071242.9, dated Sep. 18, 2016.

* cited by examiner

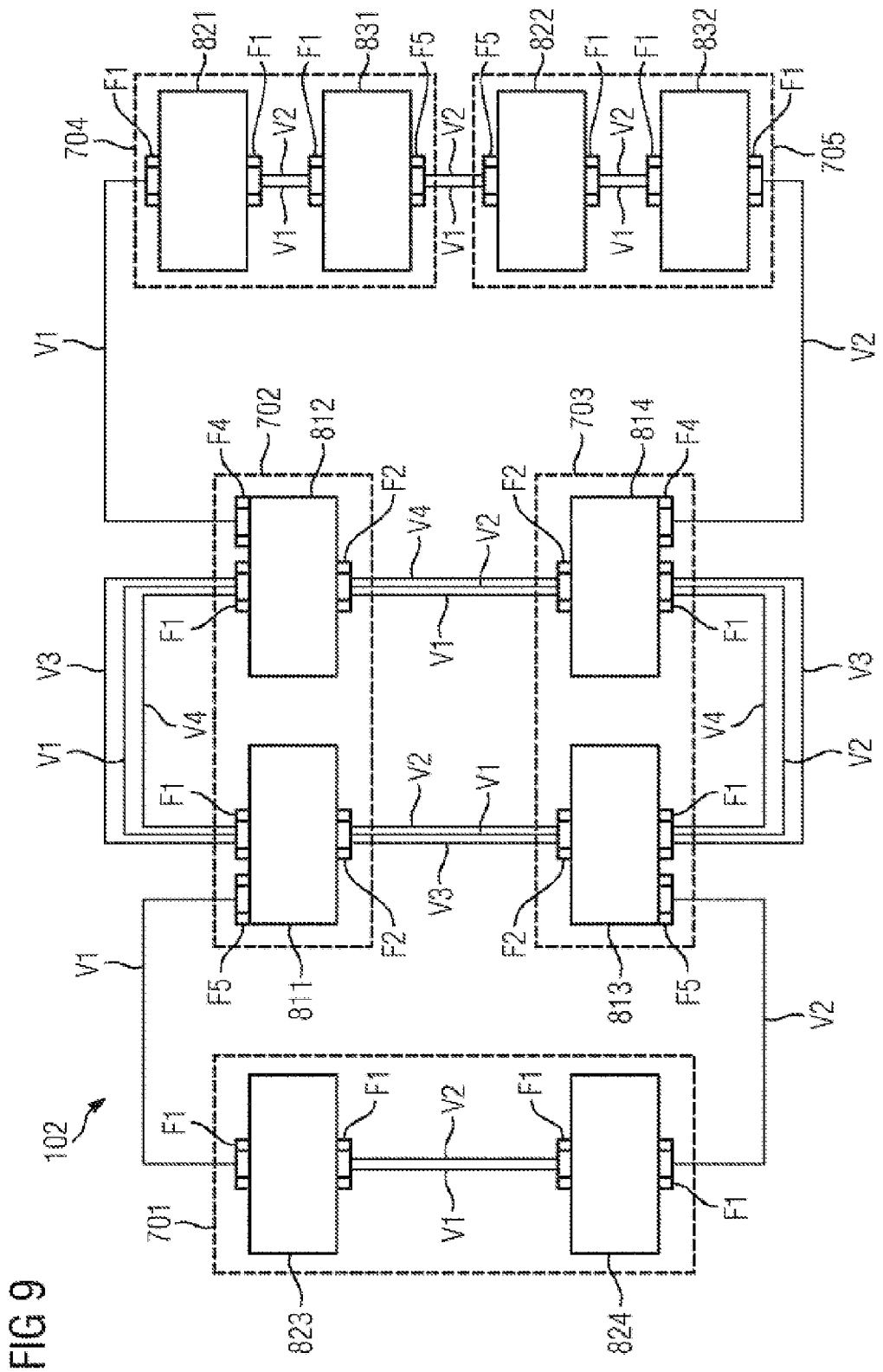

METHOD FOR OPERATING A COMMUNICATIONS NETWORK AND NETWORK ARRANGEMENT

CROSS-REFERENCE TO RELATED APPLICATIONS

This application claims priority to PCT/EP2012/069273, having a filing date of Sep. 28, 2012 which claims priority to DE Patent Application 10 2012 000 185.1 having a filing date of Jan. 9, 2012, the entire contents of each which are hereby incorporated by reference.

FIELD OF TECHNOLOGY

The following relates to a method for operating a communications network and to a network arrangement which operates with the proposed method. The method for operating can be used, in particular, in an Ethernet environment.

BACKGROUND

Communications networks are finding ever broader application for measuring and performing open-loop and closed-loop control of complex technical systems. For example, increasingly networks are being used in motor vehicles in order to form vehicle control systems. In corresponding complex and safety-relevant technical systems stringent requirements are made of the availability of the control elements which are provided as network devices. When individual components fail, such as, for example, sensors or control devices, this must not lead to failure of the entire system. Particularly safety-relevant systems are drive-by-wire systems, for example, steer-by-wire systems in which the steering wheel position is converted electromotively into wheel positions by means of network coupling of the sensor devices, control devices and actuator devices.

In the past, redundant designs of particularly critical components were used so that in the event of a failure the respective backup or redundant components can take over the respective function. When there are a plurality of redundant components it is necessary to ensure that only one of the two or more control devices has the respective control priority. Furthermore, contradictory control instructions for the same control functionalities must not arise. It is therefore necessary for all the control components to have the same information or data in the network.

In this respect, errors in the form of inconsistent data, which may be corrupted, for example, in the case of data transmission via the network which is being used, have to be detected. A standard network environment which is widely distributed is based on the Ethernet protocol. The use of Ethernet infrastructures has the advantage that standardized network devices and methods can be used. However, in the past, proprietary data_buses were also used to link control components to one another with internal redundancy, that is to say with double functionality.

Furthermore, it is possible that nodes in the network being used are faulty. Fault types are known for example in which a network device transmits at a high frequency into the network data which does not contain any data which can be used by the other control devices. The term "Babbling Idiot" is used. The network infrastructure can be overloaded by high data rates in such a way that genuine control data or sensor data can no longer be exchanged between the still functioning network devices. It is desirable to treat, in particular, such faulty behavior in safety-relevant networks and to process suitably the data which is present in order to ensure reliable operation of the unaffected devices in the network.

In the past, methods were proposed in which the data exchange between predefined communication partners was bandwidth-limited. Defective network nodes can, however, also generate data packets with inadequate address data, and within the scope of a dedicated bandwidth limitation, this cannot be handled satisfactorily in every network topology, in particular, not in a ring-shaped network topology.

Furthermore, methods are known that are based on synchronized communication of the network nodes with one another. In this context, certain timeslots are defined for the data exchange between predefined communication partners. Such timeslot methods require complex synchronization and special hardware devices.

Document EP 1 548 992 A1 discloses a method which is directed to preventing "Babbling Idiot" faults in a CAN bus system of an aircraft. The problem of a network device transmitting data at a high frequency into the network is prevented in that a bus guardian disconnects the faulty network device from the network as soon as the fault is detected.

Document WO 2005/053223 A2 also discloses avoiding a "Babbling Idiot" fault in a CAN bus system with master and slave stations. According to this disclosure, the problem is solved in that a master station isolates a faulty slave station from the network.

Document US 2009/122812 A1 discloses a method for safely powering up a "time-triggered" ring network. The central guardian of the network ensures that every station which exhibits a "Babbling Idiot" behavior becomes invisible from the network. The guardian determines the behavior of each station in the network. If the data transmission rate of a station exceeds a transmission bandwidth which is predefined for the latter, the guardian detects the station as faulty.

SUMMARY

An aspect relates to an improved method and/or a network arrangement.

Accordingly, a method for operating a communications network to which network devices are coupled is proposed. A respective network device comprises at least one switch device and at least one control device which is coupled to the switch device. The switch device has at least one reception port and at least one transmission port for transmitting and receiving data via the communications network, and the reception ports are assigned a fuse device for limiting a data transmission rate. The method comprises: predefining a maximum data transmission rate during the transmission of data, wherein the network devices are configured to transmit data at a data rate which is lower than the predefined maximum data transmission rate; monitoring a data transmission rate of received data at the reception ports of the network devices; and blocking data reception at a reception port if incoming data has a data transmission rate which is higher than the predefined maximum data transmission rate.

The combination of a transmission port and a reception port can also be understood to be a communication port of the respective device.

In one embodiment of the method, a respective network device comprises at least one switch device and a first and a second control device which are coupled to the switch device. The switch device for the first and second control device has in each case a reception port and a transmission port for transmitting and receiving data via the communications network. The reception ports are assigned fuse devices for limiting a data transmission rate.

The method then also comprises: generating first data items by means of the first control device and second data items by means of the second control device, wherein the first data items and the second data items are linked to one another by means of predefined coding; transmitting the first data items from the first control device to the second control device via the switch device and transmitting the second data items from the second control device to the first control device via the switch device; transmitting the first data items and the second data items via a first communication path from the transmission port of the switch device for the first control device to the reception port of the switch device for the second control device; transmitting the first data items and the second data items via a second communication path from the transmission port of the switch device for the second control device to the reception port of the switch device for the first control device. In this process the data items of the first and second communication paths pass through the same network devices in opposite directions.

The monitoring of the data transmission rate and the potential blocking of data reception make it possible to handle, in particular, what are referred to as "Babbling Idiots", that is to say network devices present in the network which due to a defect transmit meaningless data or data which cannot be interpreted by other devices in the network.

This "meaningless" data is often output at high frequency by the faulty devices, with the result that the network infrastructure and communication paths can become overloaded. The deactivation of the affected reception ports or the blocking of the data reception for exceptionally high data rates nevertheless permits reliable data communication even if Babbling Idiots are present.

A data transmission rate is understood to be the digital data quantity which is transmitted over a transmission channel or communication path within a time unit. The terms data transfer rate, data rate, transmission speed, connection speed, bandwidth and capacity are also used. A data transmission rate is conventionally specified in bits per second.

The maximum data transmission rate is determined as a function of the bandwidth of the communications network. If all the appropriate data transfer rates between the network nodes or network devices or transmission and reception ports are known from the topology of the network, the fuse devices can be configured in a correspondingly sensitive way.

In embodiments of the method there is also provision for releasing a data reception at a reception port if incoming data has a data transmission rate which is lower than the predefined maximum data transmission rate.

The re-release has the effect that after brief interruption a communication path comes about in the network again via which path the data which does not originate from a defective network device can be exchanged. A normal data transfer is therefore always ensured.

It is also conceivable for a maximum link transmission rate to be predefined for each communication path between a transmission port and a reception port.

For example, when designing the communications network it is possible to estimate which link transmission rates can be present. The fuse devices are then given a corresponding sensitivity level so that when the maximum link transmission rate is exceeded the data reception is suppressed.

Alternatively or additionally, the data can be assigned at least two priority classes, and the data transmission rate is monitored exclusively for data of a selected priority class and/or data reception is blocked. For example, a first priority class can relate to particularly safety-relevant data, and a second priority class can relate to less critical data. When designing the communications network, the maximum data transmission rates are then defined and the fuse devices are correspondingly set. The various priority classes are detected at the fuse devices and the data is filtered as a function thereof, or not.

The communications network itself can comprise an Ethernet infrastructure. The switch device can also be referred to as a bridge device or router device. In the case of network devices, the terms network nodes, network components or network elements are also used.

For example a CPU, a microprocessor or else other programmable circuits are possible as control devices which are provided in the network devices. In addition, a sensor device or actuator device can also be understood to be a control device.

The communications network or network protocol provides point-to-point connections from one subscriber or network device to another. In this context, bidirectional or duplex communication can be possible.

The first and second data items which are linked to one another by means of predefined coding can be generated, for example, by bit inversion. The predefined coding permits consistency checking of the two data items with respect to one another. If, for example, the data transfer via the network disrupts one of the data (packets), this can be detected by comparison with the respective other data (packet) while taking into account the respective coding.

In particular in the case of Ethernet-based communications networks bidirectional communication (referred to as Duplex Communication) is possible. In this respect, the first communication path runs from the transmission port of the switch device of the first control device to the reception port of the switch device of the second control device, and the second communication path runs from the transmission port of the switch device of the second control device to the reception port of the switch device of the first control device. The first communication path runs, for example, in a ring shape via further switch devices or further network devices via the communications network. The second communication path passes through the network devices in the opposite direction. In this respect, redundant forwarding and checking of the functional capability of all the network devices involved becomes possible. The first and second data item are conducted from the first control device to the second control device, or vice versa, exclusively via the switch device within the network device.

The method for operating a communications network, in particular on an Ethernet basis, produces a ring structure, wherein the resulting communication devices of the Ethernet ring are used. In the event of a fault a switch device of a network device which are connected to a control unit, in this context just one of the directions can be affected, so that a consistent data item or items continues/continue to be transmitted. By comparing the data items which are transmitted over different communication paths and are linked to one another, in particular, by means of coding, it is possible to carry out a flexible and reliable fault analysis. The control components or devices which have brought about a fault can easily be pinpointed. Said control components or devices are passivized or switched off.

In addition, the Babbling Idiot fault type is handled by the checking of the data transfer rate and, if appropriate, blocking reception in such a way that at least one communication path which transmits without faults is available for data items which are not disrupted or are transmitted by a defective device.

In the case of embodiments of the method, said method also comprises: transmitting the first data items and the second data items via the transmission port of the switch device for the first control device to the reception port of the switch device for the second control device via at least one further switch device of a further network device with a first and a second control device; and transmitting the first data items and the second data items via the transmission port of the switch device for the second control device to the reception port of the switch device for the first control device via at least one further switch device of a further network device with a first and a second control device.

In this context in a respective further switch device, data received at a reception port for the second control device of the further switch device is passed on to a transmission port for the first control device of the further switch device. Data received at a reception port for the first control device of the further switch device is passed on to a transmission port for the second control device of the further switch device. Corresponding fuse devices are arranged at the input ports. The uncoded or coded data is transmitted from a first channel, which starts from a first control device, to a channel which is assigned to the second control device.

This also occurs in the opposite direction as a result of which the transmitting control component can detect whether the respective other channel, which is assigned to the second (redundant) control device, has the same data result. In this respect, it is possible to detect whether the assigned Ethernet switch or the switch device is functioning reliably. If it is detected that the switch device which is assigned to the control device is behaving incorrectly, the transmitting control device is passivized.

The method can also comprise: comparing the first data items with the second data items in the first and/or second control device in order to generate a comparison result; and passivizing the network device as a function of the comparison result.

If it is detected that the first and second data items are not consistent with one another, that is to say are not linked to one another by means of the predefined coding, a fault can be detected during the data transmission or generation.

The method can also comprise: renewed transmission of the first and second data items via the first and second communication paths.

If, for example, data in a communication cycle is not detected or received again by the transmitting control device, it is possible to determine whether there is a faulty network component present in the communication path by repeatedly forwarding and checking for correctly received data.

In addition, in the method in a further network device, the first data items and the second data items can be received at input ports for different control devices and the received data items can be compared with one another.

The method for operating the network arrangement also comprises displaying a fault message if compared first data items and second data items are not linked to one another by the predefined coding.

In exemplary embodiments, specific fuse devices of at least two network devices are assigned various threshold values for the data transmission rate, wherein each of the various threshold values is lower than or equal to the predefined maximum data transmission rate. In this context, a data reception at a reception port of the at least two network devices is blocked if the incoming data at the assigned reception port has a data transmission rate which is higher than the assigned threshold value.

Consequently, at least two fuse devices (fuses) of different network devices are assigned various or different threshold values for the data transmission rate. Each of these threshold values is lower than or equal to the predefined maximum data transmission rate in the communications network. The threshold values for the data transmission rate can also be referred to as a bandwidth limit.

Using various threshold values makes it possible to form different segments or network segments in the communications network. The network segments are embodied here in such a way that they can fail as an entire segment without causing the entire system to enter a dangerous state, for example network segments with a common power supply. An entire system which is supplied by a plurality of power supplies must in any case be constructed in such a way that it can cope with the failure of one power supply.

In this context, in particular possible delaying of blocking is specifically limited to one segment if a network device babbles just under the bandwidth limit, by means of segments which are delimited by fuses with relatively low bandwidth limiting values.

The respective threshold value can be specified, for example, by a percentage related to the predefined maximum data transmission rate of the network arrangement. It is therefore possible, for example, for various threshold values to be set at 80%, 50%, 35%, 20% and 10% of the predefined maximum data transmission rate. The threshold values can be determined, for example, on the basis of the setpoint data transmission rate which is provided by means of the respective link, and possibly additionally by means of a safety margin.

In particular, the implementation of the concept of the fuse devices is not to require any change whatsoever to the hardware of the standard switch components. It is possible either to use the features of high-quality switch hardware or to add a relatively simple ballast device to the switch hardware. The available bandwidth is not adversely affected, or is adversely affected only to a small degree, depending on the embodiment.

In exemplary embodiments, the network devices are arranged distributed in a multiplicity of network segments, wherein each of the network segments is assigned a subset of the network devices. In this context, at each network segment with at least two assigned network devices a fuse device which is arranged at an edge region of the network segment is assigned a lower threshold value for the data transmission rate than in the case of a fuse device which is arranged in a middle region of the network segment.

By means of the relatively small threshold value for the data transmission rate the respective network segment can be sealed off better from the outside than would be necessary in the middle region or interior of the network segment. Consequently, fuse devices of the edge region have a lower threshold value for the data transmission rate than the fuse devices in the middle region of the network segment.

The network segments are protected from the outside with relatively small threshold values, i.e. with relatively small fuses with a relatively small reliable bandwidth. As a result, in the event of a Babbling Idiot (defective network device), transmitting with a bandwidth which is somewhat lower than the triggering bandwidth of the fuse devices, there is no longer, as it were, random triggering of any fuse device but instead the fuse device with the relatively small threshold value (relatively small bandwidth) triggers selectively so that the affected network segment is separated off from the rest of the communications network.

The fuses with a relatively large reliable bandwidth in the middle regions of the segments can also be omitted in embodiments. Said fuses ensure only that a Babbling Idiot which babbles with a very high bandwidth is isolated directly from its adjacent nodes and the adjacent nodes are therefore not adversely affected. If the fuses in the middle regions are omitted, the entire segment would always fail, but here this does not bring about a critical state of the entire system.

In particular, the subsets are formed as disjunctive subsets.

In exemplary embodiments, the network devices comprise at least two network devices which are redundant with respect to their functionality, wherein the subsets are formed in such a way that each of the subsets is assigned one of the redundant network devices at most.

Network devices which are redundant with respect to their functionality are arranged in different network segments with the result that in the event of a failure of a network segment at least one redundant network device in another network segment is still available and therefore the entire functionality of the entire system is not put at risk.

In exemplary embodiments, a multiplicity of virtual networks are implemented in the communications network in order to avoid the threshold value for the data transmission rate being exceeded at a fuse device of a network segment owing to reception of data from another network segment. The virtual networks are embodied, in particular, as virtual local area networks (VLANs).

In this context, taking into account the various virtual networks, for example various VLANs, ensures that one segment cannot be cut off owing to packets which have been fed in outside the segment. This is achieved by configuring the VLANs selectively in such a way that packets are not conducted through a segment, in particular not through an outer ring.

By using virtual networks in the communications network, it is also possible to maximize the threshold values of individual fuse devices, in particular in the edge region of the individual network segments. The overall failure probability of the entire communications network system is minimized as a result. As an alternative to VLANs it is also possible to use other suitable virtualization technologies.

In exemplary embodiments, the respective threshold value for the data transmission rate of the respective fuse device is set as a function of the virtual network in which the respective fuse device is arranged, and monitored.

In this embodiment, the threshold values can be set specifically with respect to the virtual network. If, for example, packets have to be conducted through a network segment because otherwise the network devices next to this network segment would not be reachable or would not be reachable via disjunctive paths, the threshold values (bandwidth limit) which are passed through the corresponding network segment are limited specifically, in particular on a VLAN-specific basis. As a result, it is also possible to avoid a situation in which owing to a data packet which has been generated by a Babbling Idiot outside a network segment this actual intact network segment is cut off.

Finally, a network arrangement with a plurality of network devices is proposed. The network devices are coupled to a communications network, in particular an Ethernet infrastructure, and a respective network device comprises at least one switch device and one control device. In this context, the switch device is coupled to the control devices, and the switch device comprises at least one reception port and one transmission port for transmitting and receiving data via the communications network. The network arrangement comprises fuse devices which are assigned to the reception ports in order to limit a data transmission rate. The network devices are configured to carry out a method as described above.

The network arrangement is, in particular, part of a vehicle.

The network devices can be sensor devices or actuator devices. Rotational speed sensors, brake devices or switching control devices are conceivable as sensor devices. Control devices which permit, for example, drive-by-wire can also be used. In this context, for example steering pulses or acceleration pulses are transferred electronically via the network to corresponding actuators, with the result that the desired reaction of the vehicle occurs.

The fuse devices are configured as network fuses. When a predefined threshold value of a data transmission rate for the data running through a respective fuse device is reached, the fuse device blocks the further data traffic. As soon as the data rate is below the defined threshold value again, data can run through the fuse devices again.

The threshold value is defined, in particular, as the maximum data transfer rate.

Overall, a particularly reliable network arrangement, which functions reliably even in the case of disruptions of communication channels is obtained. The redundant ring-shaped communication path device permits consistent control device communication and fault analysis and correction which are favorable in terms of expenditure and handling of faults due to Babbling Idiots in a way which is favorable in terms of expenditure.

In embodiments of the network arrangement at least one network device is equipped with a first and a second switch device, wherein the first switch device is assigned to the first control device, and the second switch device is assigned to the second control device. In this context, the switch devices each comprise at least two ports, and the switch devices are coupled to one another communicatively. The coupling can take place inside the network devices or else using transmission and input ports of the switch devices.

It is possible for the switch devices to be integrated into a single switch device which makes available the input and output ports.

In further embodiments of the network arrangement, further simple network devices can also be provided with in each case one control device and one switch device in the network arrangement. Simple network devices do not have any redundant control device in this context and can be provided for less safety-relevant functions.

The network devices and/or the fuse devices are preferably each embodied as a single FPGA, ASIC, IC chip or hard-wired microcircuit. For example, in order to form a proposed network arrangement a fuse device can be coupled in each case upstream of a reception port or input port of a switch device.

The fuse devices can be embodied, in particular, as part of the switch devices. In addition, an implementation as a program or program code for operating one of the switch devices is conceivable.

Furthermore, a computer program product is proposed which brings about the execution of the method explained above for operating a network arrangement on one or more program-controlled devices.

A computer program product such as a computer program means can be made available or supplied, for example, as a storage medium such as a storage card, USB stick, CD-ROM, DVD or else in the form of a downloadable file by a server in a network. This can occur, for example, in a wireless communications network by transmitting a corresponding file with the computer program product or the computer program means. In particular a network device as prescribed above is possible as a program-controlled device.

Further possible implementations of the invention also comprise combinations, not explicitly mentioned, either of method steps, features or embodiments of the method, of the network arrangement, of the network device or of a network node, which are described above or below with respect to the exemplary embodiments. In this context, a person skilled in the art will also add or modify individual aspects as improvements or supplements to the respective basic form of the invention.

BRIEF DESCRIPTION

Some of the embodiments will be described in detail, with references to the following figures, wherein like designations denote like members, wherein:

FIG. 9 shows a schematic illustration of a seventh embodiment of a network arrangement.

DETAILED DESCRIPTION

Figure 1:
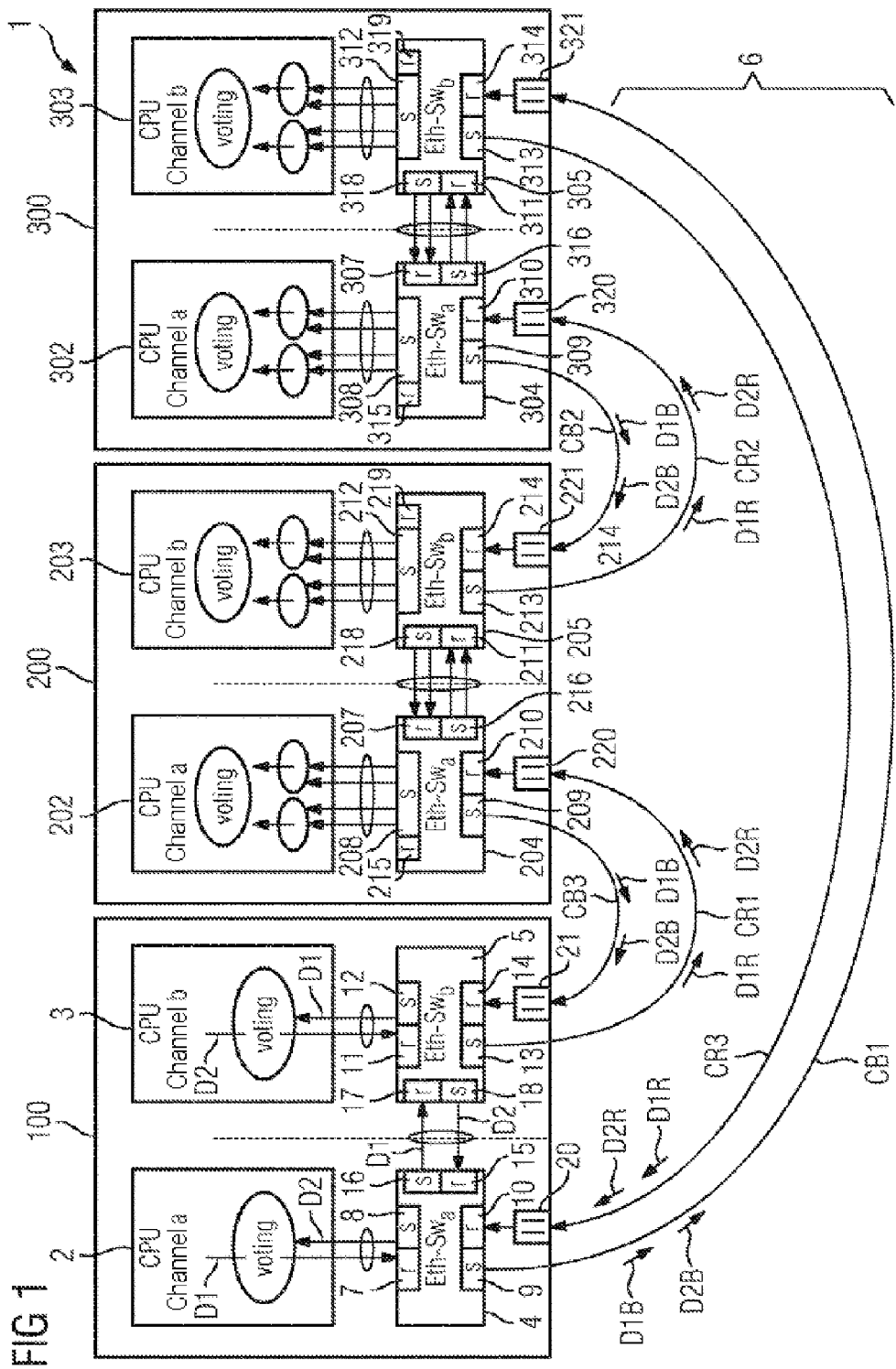
FIG. 1 shows a schematic illustration of a first embodiment of a network arrangement.

In the figures, identical or functionally identical elements have been provided with the same reference symbols unless stated otherwise. FIG. 1 illustrates a schematic illustration of a first embodiment of a network arrangement. The figures also serve to explain the method for operating the network arrangement.

FIG. 1 shows a network arrangement 1 which can be used, for example, as an Ethernet network in a vehicle. In this context, for example three network devices 100, 200, 300 are illustrated. These can be, for example, control components. The network devices 100, 201, 301, which are also referred to below as network nodes or control components, each have redundant control devices 2, 3, 202, 203, 302, 303. The network devices 100, 201, 301 can also be referred to as subscribers of the network.

The control devices 2, 3, 202, 203, 302, 303 are adapted in order to perform certain tasks or functions. This may be, for example, sensor detection or an actuator. They can also be implemented as CPUs or microprocessors. It is conceivable, for example, that the control component 100 is configured to detect a pedal state or a steering movement in the vehicle. It is conceivable, for example, that the control component or network device 100 transmits a control signal or control data to a further control component in the network. In this context it is to be ensured, in particular, in the case of safety-relevant applications in motor vehicles, for example in the case of drive-by-wire, that the control data items are present consistently at all network nodes.

The control components or network nodes or network devices 100, 200, 300 are equipped with redundant Ethernet switch devices 4, 5, 204, 205, 304, 305. The Ethernet switch devices 4, 5, 204, 205, 304, 305 each have transmission or output ports 9, 13, 209, 213, 309, 313 and reception or input ports 10, 14, 210, 214, 310, 314 by means of which coupling to the communications network 6 takes place. The reception ports 10, 14, 210, 214, 310, 314 are assigned fuse devices 20, 21, 220, 221, 320, 321 which detect the respectively occurring data transfer rate. If a predefined maximum data transfer rate is exceeded, the fuse device triggers and blocks the data transfer.

The network device 100 comprises here a CPU 2 and an assigned Ethernet switch device 4. The Ethernet switch device 4 has a reception port 7 and a transmission port 8 which are coupled communicatively to the CPU 2. A further transmission port 9 and reception port 10 are coupled to the network 6 for transmitting and receiving data. The fuse device 20 is arranged between the network 6 and the reception port 10. Similarly, the CPU 3 has an Ethernet switch device 5 which has a reception port 11 and a transmission port 12 for coupling to the CPU 3. The Ethernet switch device 5 also has a transmission port 13 and reception port 14 for coupling to the network 6. The fuse device 21 is arranged between the network 6 and the reception port 14. Furthermore, transmission port and reception port 15, 16, 17, 18 are provided at the Ethernet switches 4, 5 in order to couple the two switch devices 4, 5 to one another. The two switch devices 4, 5 are fabricated separately here, for example as FPGA or ASIC or microchip.

Analogously, the control components 200 and 300 have switch devices 204, 205, 304, 305 which are separate from one another and have transmission and reception ports 204, 210, 213, 214, 215, 219, 304, 310, 313, 314, 315, 319 for coupling to the network 6. In addition, fuse devices 220, 221, 320, 321 are arranged between the reception ports 210, 214, 310, 314 and the communications network 6.

The redundantly generated control data items D1 and D2 are compared inside the network components. The CPU 2 supplies data items D1, and the CPU 3 supplies data items D2. In this context, the data items are linked to one another by means of coding. That is to say the data items D1 are obtained from the data items D2, and vice versa, by means of a mathematical operation. For example a simple bit inversion is conceivable so that the data items D1 are the inverse of the data items D2, and vice versa.

The internal consistency check in the control component 100 is carried out by generating the data items D1, transferring them to the Ethernet switch 4 at the port 7 and passing them on via the port combination 16, 17 to the Ethernet switch 5 which supplies the data items D1 to the CPU 3. Analogously, the data items D2 are transferred via the ports 11, 18, 15 and 8 to the CPU 2. In this respect, an internal consistency check can be carried out by means of the consistent coding of the data items D1 and D2 with respect to one another. Insofar as the data items are consistent with one another, that is to say the modulos of the predefined coding—for example bit inversion—correspond to one another, it can be assumed that the data reception via the ports 7 and 11, the data transmission via the ports 8 and 12, the switch devices 4, 5 for the data exchange between these actual ports, as well as also the CPUs 2, 3, are functioning correctly. On the other hand, if the comparison result shows inconsistency of the data items D1 and D2 with one another, this indicates an error in the CPUs 2, 3 or the switch devices 4, 5, a possible reaction to which is passivation—i.e. deactivation—of the control component 100 in order to protect the data consistency.

Similar consistency checks are carried out in the network devices 200, 300. The data items which are transmitted between the two switches 204, 205 and 304, 305, respectively, are not provided with reference symbols in FIG. 1. From top to bottom data items D2B and D1B are respectively transmitted from the port 218 to the port 207. The data items D1R and D2R are transmitted from the port 216 to the port 211. In precisely the same way, data items from the port 318, which correspond to D2B and D1B, are received by the port 307. Data items from the port 316, which correspond to D1R and D2R, are received by the port 311. The network arrangement 1 is configured for ring-shaped communication paths. Two communication rings which are separate from one another and which share only the respective switch devices, but do not use any common ports there on the transmission side and reception side, can be brought about by virtue of the possibility of point-to-point connections of subscribers or network devices with one another which is present, in particular, in an Ethernet infrastructure. In the exemplary embodiment in FIG. 1, a first communication path, which is composed of the segments CB1, CB2 and CB3, is produced. The data items D1 and D2 run via these segments CB1, CB2 and CB3, which is indicated using the arrows D1B and D2B. In this context, the additional B stands for the communication path B.

In addition, a communication path which is composed of the segments CR1, CR2 and CR3 runs in the opposite communication direction. Likewise, the data items D1 and D2 are transmitted via this path, which is indicated by the arrows D2R and D1R. In this context, the additional R stands for the communication path R.

The data items D1 and D2 are therefore transferred via disjunctive communication paths to all the control components 201, 301 which are present in the network. Each CPU 202, 203, 302, 303 receives the coded and uncoded data items D1, D2 via different communication paths, specifically the two logic rings with opposing communication directions. Cabling here comprises a single ring. Each CPU 202, 203, 302, 303 compares the received values for the data items D1, D2 via a communication path.

For example, the CPU 303 receives the data items D1B and D2B via the communication path CB1. Said data items are accepted at the input port 314 of the switch device 304 via the fuse device 321. At the transmission port 312, the switch device 304 passes on the data items D1B and D2B which were received at the input port 314 to the CPU 303. There, the data items D1B and D2B can be compared. If said data items are consistent with one another, this indicates a fault-free communication path CB1.

The CPU 303 also receives the data items D1R and D2R via the second communication path which is produced from the segments CR1 and CR2. The data items D1R and D2R are received at the reception port 310 by the switch device 304 via the fuse device 320 and output to the transmission port 312, which is assigned to the CPU 303. Consistency checking can take place again. Furthermore, the CPU 303 can then carry out a comparison or voting of the data received via the ring path CB1 as well as data received via the ring path CR1 and CR2. In a case without disruption, both the data items D1R and D2R are consistent with one another, and the data items D1B and D2B as well as those received via CB1 and via CR1-CR2 and individual data items which have already been detected as being consistent. As a result of this the underlying data items D1 and D2 which were generated by the CPU 2 or 3 are correct. If inconsistencies occur in the comparisons or the voting operations of the data items which were received via CB1 and via CR1-CR2 and detected individually as already being consistent in the control component 3 or the CPUs 302, 303, a communication error can be deduced.

Similar consistency checks occur in the control component 201 and the CPUs or control devices 202, 203. If one of the participating switch device 4, 5, 204, 205, 304, 305 operates incorrectly or fails, a corresponding network fault can be detected if the data items D1, D2 are transmitted repeatedly. As a rule, a plurality of communication cycles with different data of different control devices is transmitted on the network 6. On the basis of other data (not illustrated in FIG. 1), the respective control components 201, 301 can detect whether or not their own switch 204, 205, 304, 305 is defective. In this respect, various fault scenarios can be detected and handled. As a result of the disjunctive data paths CB1, CB2, CB3 and CR1, CR2, CR3, errors during transmission occur only independently of one another. As a result of the configuration as an Ethernet ring of the network nodes or components 100, 201, 301, largely consistent communication of control apparatuses, which have, in particular, redundant control devices 2, 3, is ensured.

The fuse devices 20, 21, 220, 221, 320, 321, which are used are through-switching in the operating situation of the network arrangement 1 as illustrated in FIG. 1. That is to say the data is not blocked. This is indicated in the figure by the two parallel dashes.

It is possible that parts of a network device are damaged in such a way that only data which now cannot be interpreted, that is to say unusable, is generated and transmitted into the network. The term Babbling Idiot is used, that is to say a network device which generates unusable data and transmits it into the network, as a result of which meaningless data packets of this type overload the infrastructure. It is possible here that the data packets are transmitted with false address data and impede only the data traffic. In the case of a Babbling Idiot, the data rate at which corresponding data packets are generated and transmitted is also usually high.

In order to be able to handle the fault scenario of a Babbling Idiot suitably, the network devices in the network arrangement 1 are configured in such a way that each network device 100, 200, 300 can transmit at a predefined maximum data transfer rate. For example, the maximum data transfer rate can be a predefined percentage of the physically maximum possible data transfer rate in the communications network. In this respect, in the case of functionally capable and fault-free network devices or elements, none of the transmission ports 9, 13, 209, 213, 309, 313 can output a higher data rate than the maximum predefined data rate. This can be carried out by means of corresponding programming of the network devices 100, 200, 300.

The fuse devices which are configured as network fuses 20, 21, 220, 221, 320, 321 trigger if the corresponding data rate is higher than the maximum predefined data transfer rate. As a result of this measure a Babbling Idiot can also be overcome in this scenario.

Figure 2:
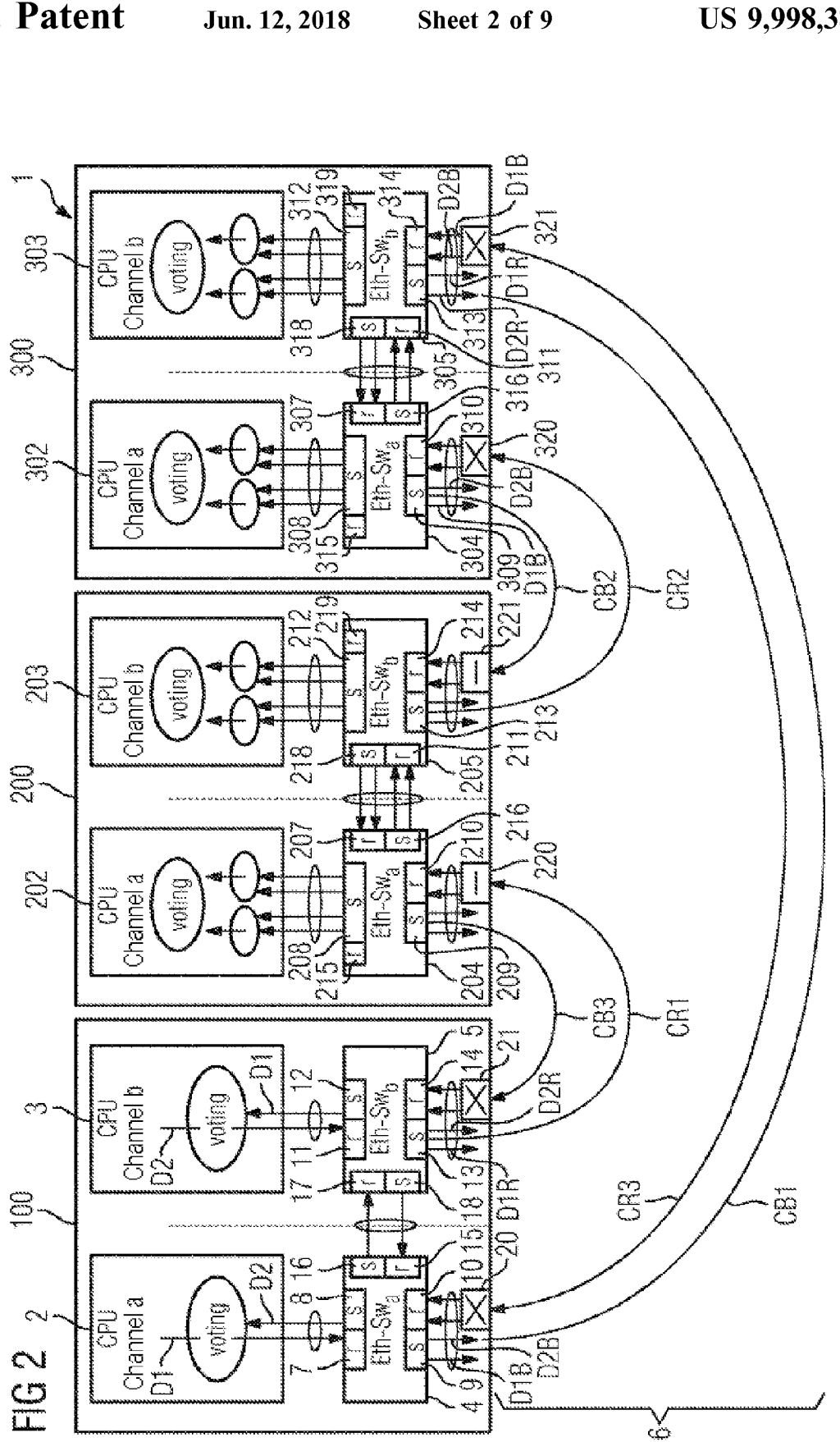
FIGS. 2 and 3 show schematic illustrations of the embodiment of the network arrangement with communication sequences explaining method aspects of troubleshooting.

In FIG. 2 it is assumed, for example, that the switch device 205 is faulty in such a way that it generates and outputs meaningless data packets at an unrestricted data rate, that is to say the maximum possible in the network. In this respect, the network device 200 is to be considered to be a Babbling Idiot. The network arrangement 1 which is described with respect to FIG. 1 is illustrated in FIG. 2 and also in FIG. 3. Since the transmission ports 213 and 218 of the defective switch device 205 transmit meaningless data packets, the network is filled with this meaningless data.

However, the fuse devices 20, 21, 320, 321 detect that the data transfer rate is above the predefined maximum data transfer rate. That is to say the fuse devices 20, 21, 320, 321 trigger and block the data traffic for the reception ports 10, 14, 310, 314 assigned to them. The fuse devices 220 and 221 of a network device 200 are not of interest here. The triggered fuse devices 20, 21, 320, 321 are characterized by a cross. The irrelevant fuse devices 220, 221 are provided with a horizontal dash.

In the faulty operating situation as indicated in FIG. 2, data is no longer received by the functionally capable network devices 100, 300. However, the network devices are configured to transmit the self-generated data onward. For example, the network device 100 continues to transmit data items D1B, D2B, D1R and D2R into the network 6 via the transmission port 9 and 13.

As a result of the blocking of the data reception or triggering of the fuses 20, 21, 320, 321, the data transfer rate at the fuse devices 20, 321, which are not directly coupled to the Babbling Idiot 200, drops again below the predefined maximum data transfer rate. That is to say as a result the fuses or fuse devices 20, 321 release the data reception again for the reception ports 10, 314 which are assigned to them. This situation is illustrated in FIG. 3.

However, the fuses or network fuses 21, 320 continue to be triggered and to block.

Figure 3:
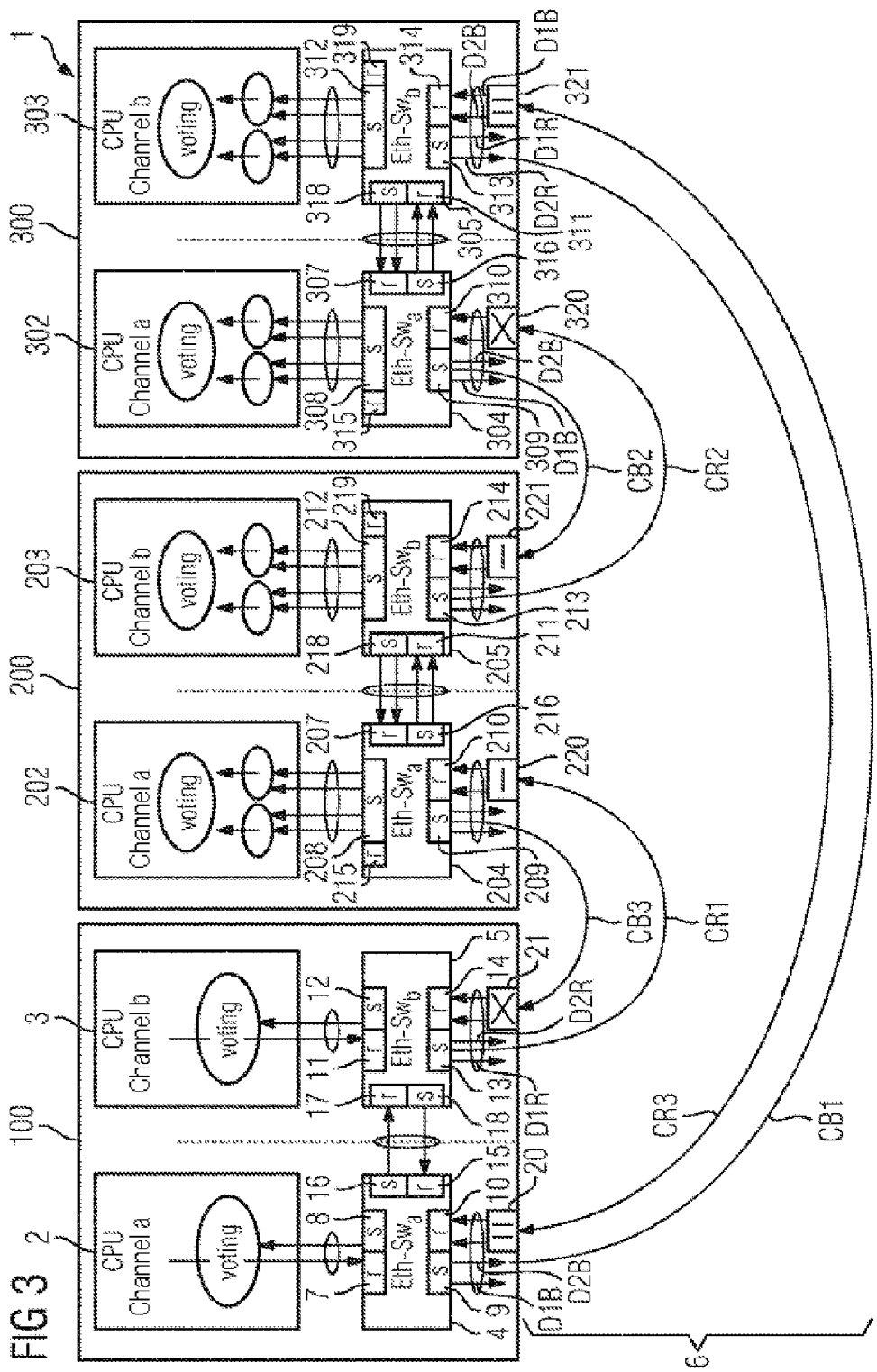

In FIG. 3 it is clear that a reliable data transfer is now again possible between the network device 100 and 300. This is because the communication paths CB1 and CR3 are isolated from the meaningless data packets which the Babbling Idiot 200 generates. In this respect, this can be handled even when a fault occurs during which a network device or the elements thereof output meaningless data at a high data rate into the network. Nevertheless, further secure communication between all the network devices which are not completely defective is ensured.

Figure 4:
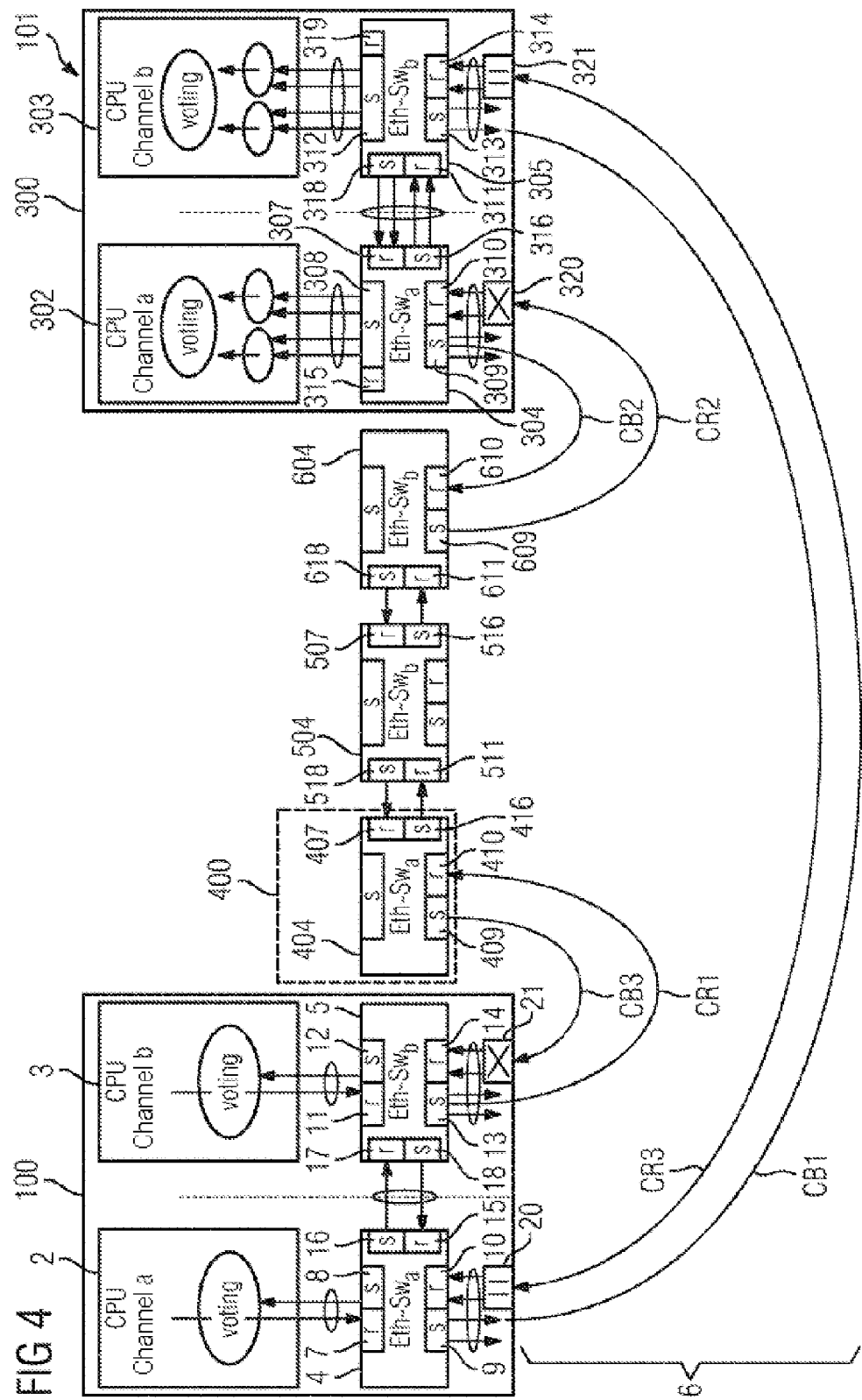
FIG. 4 shows a schematic illustration of a second embodiment of a network arrangement.

FIG. 4 shows a further embodiment of a network arrangement 101. Compared to the illustrations in FIGS. 1-3 the middle network device is replaced by three simple switch devices 404, 504, 604 which are coupled to one another serially. The switch devices 404, 504, 604 can also be considered to be unsecured network devices. For example, the switch device 404 is part of such an unsecured network device 400. For example, for applications which are particularly uncritical in terms of safety corresponding simple network devices which are not of redundant design are used in a vehicle.

The simple switch devices 404, 504, 604 are coupled to one another via transmission and reception ports 407, 416, 504, 511, 507, 516, 611, 618. The switch device 404 has a transmission port 409 and a reception port 410 which are coupled to the communications network, that is to say the Ethernet 6. The switch device 604 has a transmission port 609 and a reception port 610, which are also coupled to the communications network 6. Communication path segments CB1, CB2, CB3 and CR1, CR2, CR3 are produced, as is already indicated in FIGS. 1-3. The reception ports 10, 14, 310, 314, which are associated with the switch devices 4, 5, 304, 305 of the network devices 100, 200, are coupled to the network 6 via fuse devices 20, 21, 320, 321.

If one of the simple switch devices 404, 504, 604 then becomes a Babbling Idiot, the data rate firstly rises in the entire network and exceeds the predefined maximum data transfer rate at the reception ports. The fuse devices 21 and 320 then block the data reception for the ports 14 and 310. As a result, the section composed of switch devices 404, 504, 604 is decoupled from the data communication. However, the fuse devices 20, 321 which control the data transfer to the reception ports 310, 314 switch through. In this respect, even in the case of irregularities of the unsecured network device 4 or else of the switch device 504, which is a Babbling Idiot, data exchange is ensured. Communication continues to be possible between the functioning safety-relevant network devices 100, 300 via the transmission and reception ports 9, 10, 313, 314.

Figure 5:
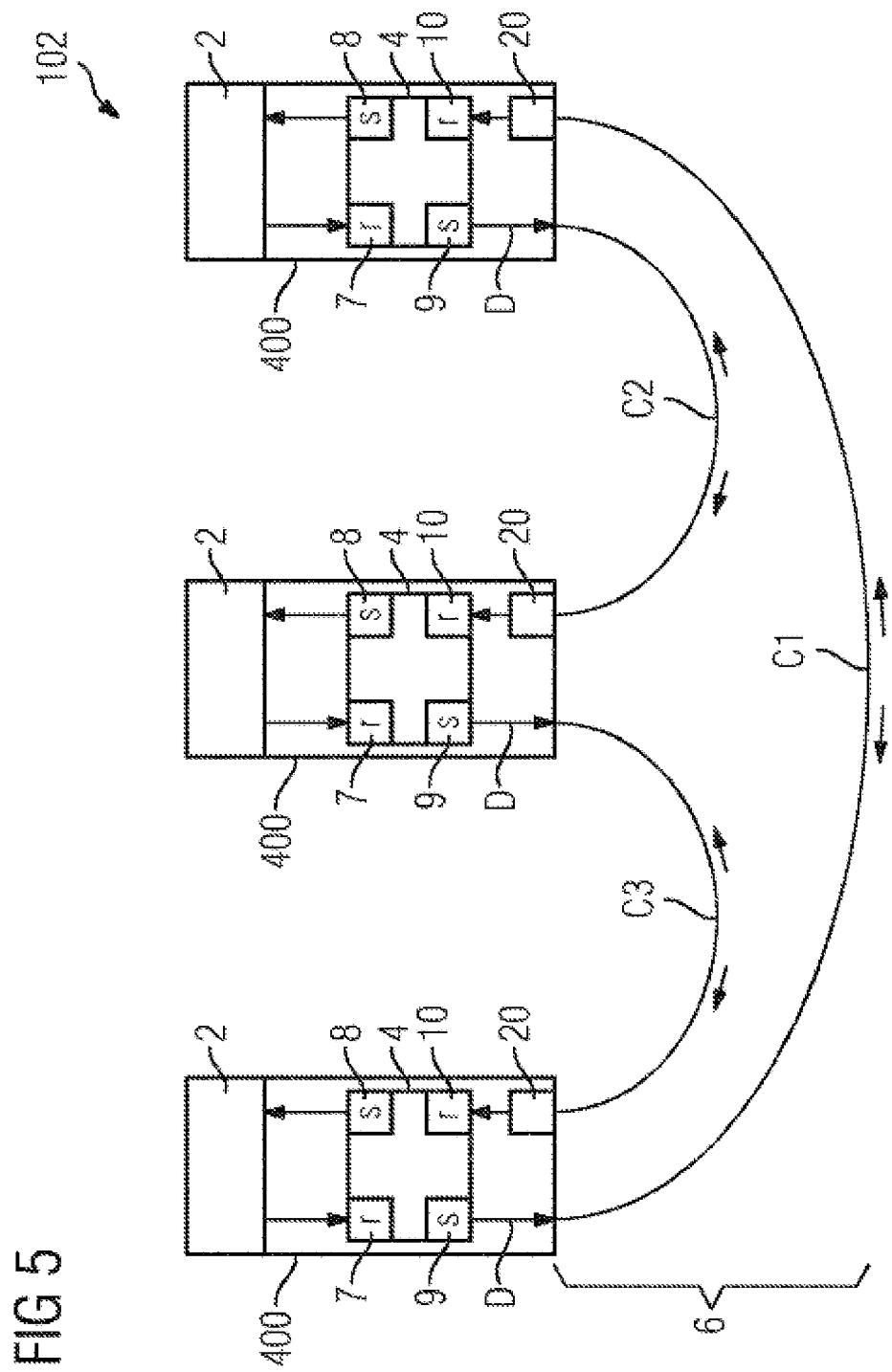
FIG. 5 shows a schematic illustration of a third embodiment of a network arrangement.

FIG. 5 shows a further embodiment of a network arrangement. The network arrangement 102 comprises here simple network devices 400 which each have just one control device 2 and one switch device 4. The switch device has in each case a reception port 10 and a transmission port 9 coupled to the communications network 6 for respectively outputting and inputting data D. In addition, the control device or CPU 2 is connected communicatively to the switch device via transmission and reception ports 8, 7.

The reception ports 10 are assigned fuse devices 20 which completely block data transfer when a defined maximum reception data rate is exceeded. The network arrangement is operated here in the way already described above.

The method and the proposed network arrangement with its ring structure and monitoring of the data transfer rate at the reception ports of the network devices therefore provides highly consistent and reliable control apparatus communication in safety-relevant applications. All possible individual faults either do not bring about a situation in which consistent data cannot be generated in one or more network devices or said individual faults can be localized within a communication cycle. Furthermore, the disruption of a network device as a Babbling Idiot, that is to say uncontrolled forwarding of data at a high data rate into the network cannot bring about a failure of the communication. The proposed network arrangement permits, in particular, even unprotected network devices with in each case at least one control device and at least one switch device to be provided in the network arrangement. The unprotected network devices do not, for example, have fuse devices at the reception ports, they are conventional Ethernet apparatuses. The unprotected network devices nevertheless cannot disrupt the reliable traffic since they are disconnected by means of the fuse devices of the nearest protected network device, which is therefore provided with a fuse device, if one of the unprotected network devices becomes a Babbling Idiot.

In a further embodiment, the embodiment described above could also be applied in a network with any desired network topology if the traffic patterns in this network are known.

An alternative embodiment consists in the fact that instead of measuring the bandwidth at the input ports the residence time, i.e. the waiting time, of high-priority packets in the network device is measured. If the residence time exceeds a calculated maximum, it can be concluded therefrom that the permissible bandwidth has been exceeded and the fuse can trigger.

The described fuse (fuse or network fuse) can, on the one hand, be implemented directly in the switch ASIC if the latter assists rate limiting and rate monitoring or stream sensitive rate monitoring. As a result, it is possible to implement the network fuses without additional hardware.

Alternatively, the network fuse can be implemented in additional components, for example FPGAs which are connected upstream of the external inputs of the network devices. As a result, simple switches can be used, and at the same time the implementation of the network fuses in stand-alone hardware simplifies certification, under certain circumstances.

Figure 6:
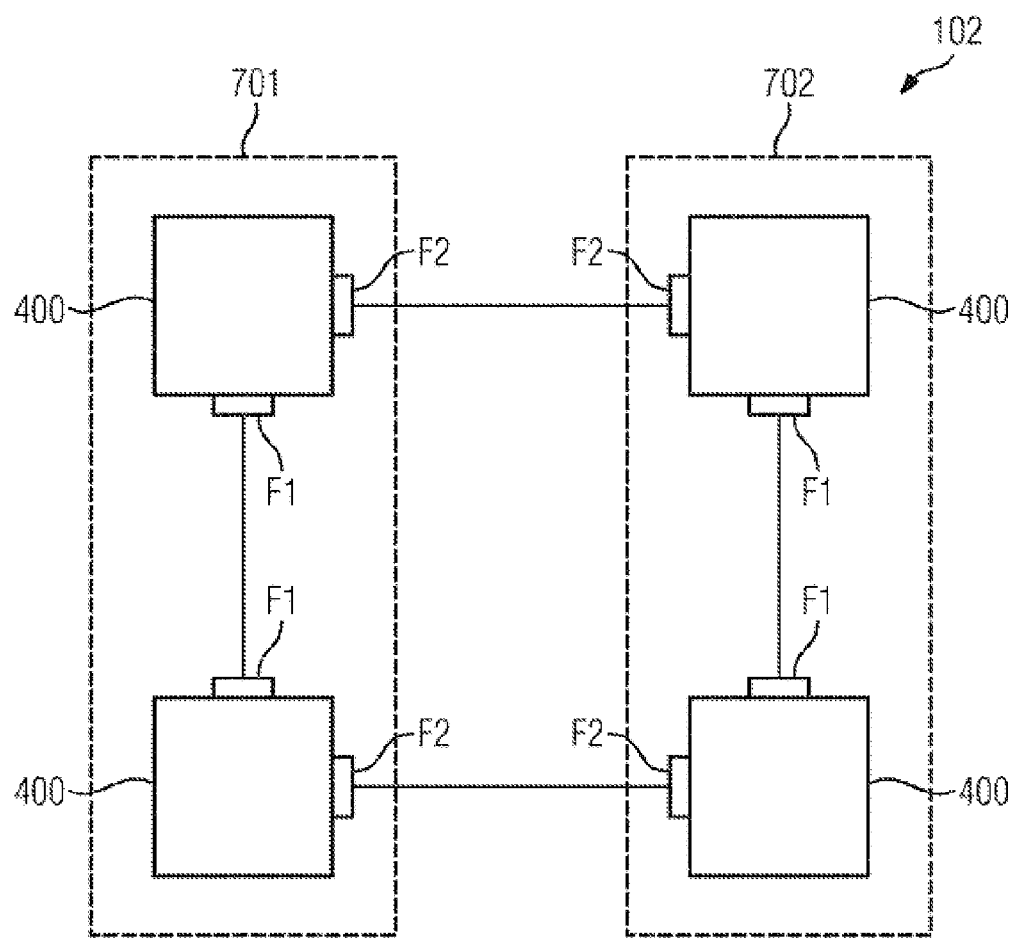
FIG. 6 shows a schematic illustration of a fourth embodiment of a network arrangement.

FIG. 6 shows a schematic illustration of a fourth embodiment of a network arrangement 102. The network arrangement 102 has four network devices 400. The respective network device 400 can be based on one of the exemplary embodiments in FIGS. 1-5. The network devices 400 can have different functionalities. For example, the two upper network devices 400 in FIG. 6 can be embodied as control computers and the two lower network devices 400 as actuators. The left-hand network devices 400 are part of a first network segment 701. In contrast, the right-hand network devices 400 are part of a second network segment 702.

In the middle region (inner region) of the respective network segment 701, 702, first fuse devices F1 are provided which have a higher threshold value for the data transmission rate than those fuse devices F2 which are arranged in the edge region of the respective network segment 701, 702. Accordingly, the first fuse devices with the higher threshold value F1 for the internal communication are provided in the respective network segment 701, 702. In contrast, the fuse devices F2 with the lower threshold value for the data transmission rate are provided for the external communication between the network segments 701, 702.

Figure 7:
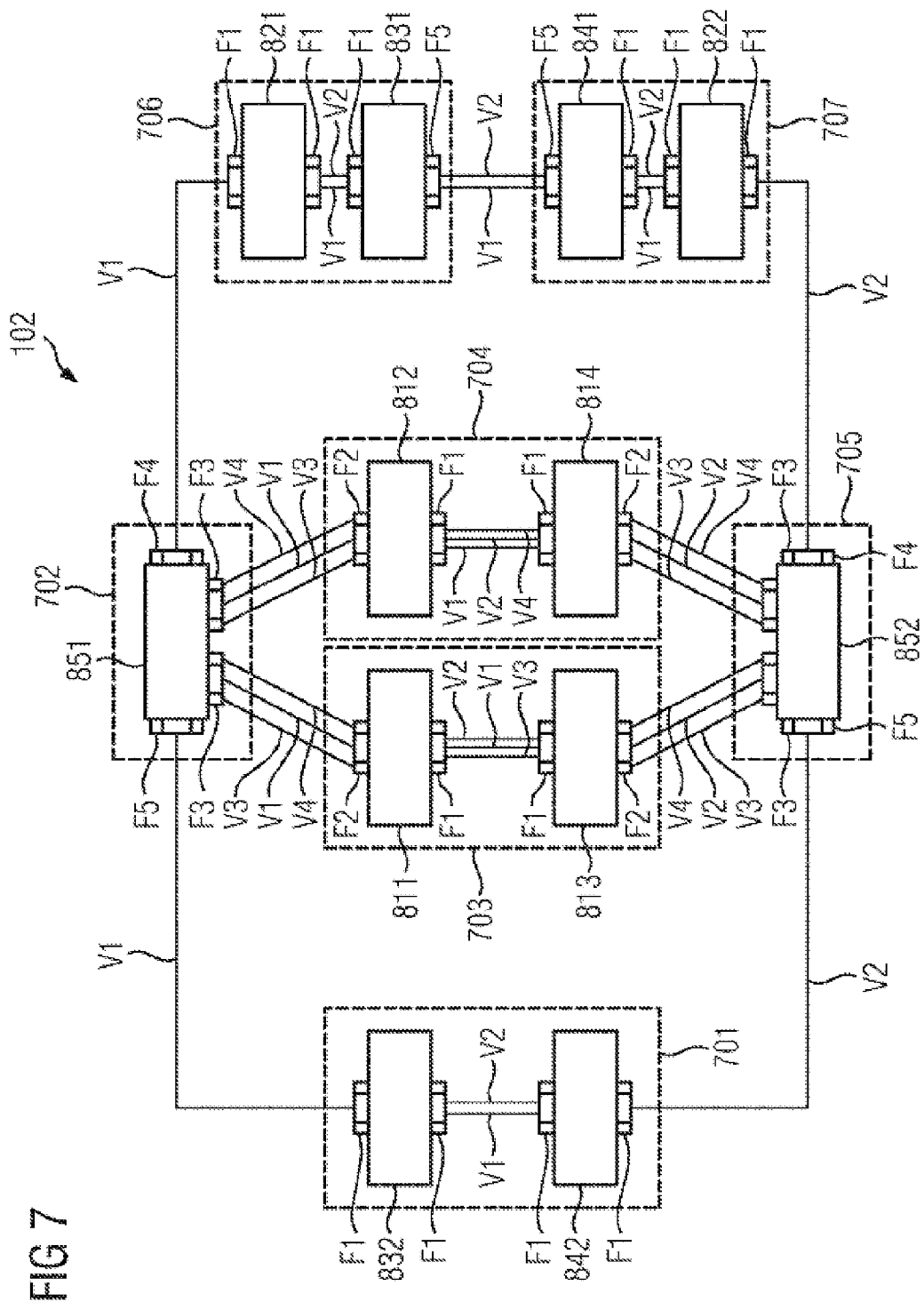
FIG. 7 shows a schematic illustration of a fifth embodiment of a network arrangement.

FIG. 7 shows a schematic illustration of a fifth embodiment of a network arrangement 102.

The network arrangement 102 in FIG. 7 has twelve network devices 811-814, 821-822, 831-832, 841-842, 851-852 with different functionalities. The network devices 811-814 are embodied as control computers. The network devices 821-822 form a node of a first type, the network devices 831, 832 form a node of a second type and the network device 841, 842 form a node of a third type. The network devices 851, 852 are embodied as coupling switches.

In addition, the network arrangement 102 has four implemented virtual networks V1-V4. In this context, the reference symbols V1-V4 in FIG. 7 illustrate which virtual lines are associated with which virtual network V1-V4.

In addition, five different fuse devices F1-F5 with different threshold values are used in the network arrangement 102. The first fuse device F has, for example, a threshold value of 80% of the predefined maximum data transmission rate of the network arrangement 102, F2 of 50%, F3 of 35%, F4 of 20% and F5 of 10%.

The network arrangement 102 is embodied as a triple ring-shaped network, and it is also possible to refer to an inner ring with outer rings or loops. An inner ring is formed with the control computers 811-814, two outer rings are formed with the nodes 821-822, 831-832 and 841-842. Two disjunctive, loop-free paths between all the control computers 811-814 and between the control computers and the nodes are formed by the virtual connections V1-V4 on the basis of the ring-shaped topology.

In the embodiment in FIG. 7, all the network devices are present in a redundant fashion, and therefore there is, for example, a node 821 which is redundant with respect to the node 822. Correspondingly, the node 831 is redundant with respect to the node 832, and the node 841 is redundant with respect to the node 842. If one of these nodes fails, the entire system of the network arrangement 102 continues to be functionally capable. The units digit in the three-digit references of the network devices 811-814, 821-822, 831-832, 841-842 and 851-852 can indicate different circuits for supplying power. If a power supply were then to fail, one of each pair of redundant nodes of the same type would be supplied with current and connected to the network arrangement 102. The segments 701-707 are correspondingly selected in such a way that when a segment 701-707 is disconnected, at least one of each pair of redundant nodes remains connected to the communications network 102.

That is to say if two redundant nodes, for example the nodes 821 and 822, are installed in an outer ring, fuse devices with relatively low threshold values have to be installed between these fuse devices. Here, this is the fuse device F5 with 10% of the predefined maximum data transmission rate of the communications network 102.

By using the four virtual networks V1-V4 it is possible that a data packet which would be fed into the outer or inner ring via one of the coupling switches 851, 852 never leaves this ring again through the other coupling switch 852, 851. In order, nevertheless, to permit two disjunctive paths between all the nodes, the described four virtual networks V1-V4 are used.

The function of the fuse devices F1-F5 or fuses in the embodiment in FIG. 7 is clarified by the following example. In this example it is assumed that the node 822 is the Babbling Idiot.

In this context, the following cases case 1 to case 4 are differentiated:

Case 1:

The node 822 babbles with a bandwidth of up to 9%−ε. This babbling with a low bandwidth is not detected by any fuse F1-F5. The node 841 still adds its planned bandwidth, for example 1%, to the data packets which the node 822 sends up to the node 841. Nevertheless, a threshold value is not exceeded. The used 9% of the bandwidth does not give rise to any adverse effect on the entire system of the network arrangement 102.

Case 2:

The node 822 babbles with a bandwidth of 9%+ε up to 20%−ε: the node 841 adds its planned portion of 1%, which triggers the fuse device F5 of the node 831. The node 822 is then to be assumed to be defective. The node 841 is not defective but is disconnected from the communication and is therefore lost. The connection via the path V1 is interrupted by the fuse device F5, and the connection via the path V2 is interrupted by the defective node 822.

Case 3:

The node 822 bubbles with a bandwidth of 20% up to 80%−ε: in addition to the fuse F5 at the node 831 the fuse F2 at the coupling switch 852 triggers. The segment 707 composed of the nodes 821 and 841 then is disconnected from the communication. The rest of the communications network 102 is not adversely affected. Only the redundancy in the right-hand outer ring is then lost.

Case 4:

The node 822 babbles with a bandwidth of more than 80%: the fuse F2 at the lower coupling switch 852 and the fuse F1 at the node 841 trigger. The node 822 is therefore disconnected from the communication, and the rest of the communications network 102 is not adversely affected, and only the redundancy in the right-hand outer node is lost. The node 841 is not lost either. If the fuse F1 had been omitted at the node 841, the same state as in case 3 would occur. The fuses in the middle regions of the segments only improve the availability of individual nodes and are not absolutely necessary.

The following second example is based on the assumption that the control computer 811 is the Babbling Idiot:

Here too, four cases 1 to 4 can be differentiated:

Case 1:

The control computer 811 babbles with a bandwidth of up to approximately 22.5%–ε. The control computer 813 adds the bandwidth of, for example, 12.5% which is provided for it. The fuses F3, F2, F1 at the coupling switches 851, 852 do not trigger. One of the fuses F5 between the nodes 831 and 841 can possibly trigger since a lower permissible bandwidth is set here. This effect does not, however, lead to loss of a node. The fuses which can disconnect the outer rings from the coupling switch lying opposite do not trigger since the data packets transmitted to the outer ring have to be associated with the VLAN V1 or the VLAN V2. In no case are data packets which have been transmitted via the one coupling switch 851, 852 received by the other coupling switch 852, 851 since the latter is always associated with the other VLAN V1 or V2. Therefore, no nodes and no computers 811-814 are excluded from the communication.

Case 2:

The control computer 811 babbles with a bandwidth of approximately 22.5% to 35%–ε: the control computer 813 adds the bandwidth of, for example, 12.5% which is provided for it. The fuse F3 at the coupling switch 852 triggers. The fuse F3 lying opposite at the coupling switch 851 lying opposite does not trigger. In the worst case, the control computer 811 babbles in this direction on the VLAN V4. In this case, the fuse F3 at the connection between control computer 814 and coupling switch 852 could trigger after the control computers 812 and 814 have added their data. The control computers 812 and 814 would therefore still be available, but no longer connected to the outer rings in a redundant fashion. A non-redundant connection to all the nodes would, however, still be present. Additional limitation of the bandwidth for the VLANs V3 and V4 of the inner ring could improve this case to the effect that redundant coupling of the control computers A11-A14 is maintained since triggering of the fuse F3 at the coupling switch 852 could be prevented.

Case 3:

The control computer 811 babbles with a bandwidth of more than 35%: the left-hand fuses F3 of the coupling switches 851, 852 trigger, and the control computers 811 and 813 are lost but the control computers 812 and 814 remain connected in a redundant fashion.

Case 4:

The control computer 811 babbles with a bandwidth of more than 80%. The fuse F1 between the control computer 811 and the control computer 813 triggers. The control computer 811 is therefore disconnected but the further control computers 812 to 814 remain fully connected.

The following further example is based on the assumption that the coupling switch 851 is the Babbling Idiot. Four cases 1-4 can also be differentiated here:

Case 1:

The coupling switch 851 babbles with a bandwidth of less than 8%: the nodes 821 and 831 add their planned bandwidth, for example 1% each. The fuse F5 at the node 841 does not trigger. The fuses F4 and F5 of the lower coupling switch 852 do not trigger either since the upper coupling switch 851 can babble only on the VLAN V1, but these data packets are not accepted by the lower coupling switch 852. In the inner ring no fuses trigger but approximately 8% of bandwidth is wasted.

Case 2:

The coupling switch 851 babbles with a bandwidth of 8% to 10%–ε: the nodes 821, 831 add their respective planned bandwidth. The fuse F5 of the node 841 triggers. The nodes 821 and 832 are disconnected from the rest of the communications network 102. The fuses F4 and F5 of the lower coupling switch 852 do not trigger since the upper coupling switch 851 can babble only on the VLAN V1. Accordingly, data packets from the upper coupling switch 851 are not accepted at the lower coupling switch 852. In the inner ring no fuses are triggered. However, approximately 10% of bandwidth is wasted.

Case 3:

The upper coupling switch 851 babbles with a bandwidth of 10% to 50%–ε: the fuse F5 of the node 841 therefore triggers. The nodes 821 and 831 are disconnected from the rest of the communications network 102. The fuses F4 and F5 of the lower coupling switch 852 do not trigger since the upper coupling switch 851 can babble only on the VLAN V1, but these data packets are not accepted by the lower coupling switch.

The control computers 811-814 each add their planned bandwidth of 12.5%. At the lower coupling switch 852, the two fuses F3 would trigger if the upper coupling switch 851 babbles at its left-hand port on the VLAN V3 and at the right-hand port on the VLAN V4. In this very improbable case, all control computers 811-814 would be lost.

In this case, the data packets which are generated by the upper coupling switch 851 and which were passed through the segment 704 have brought about the triggering of the right-hand fuse F3 of the coupling switch 852 and therefore the disconnection of this actually intact segment 704. In order to avoid this worst case, the bandwidth for the VLANs V3 and V4 is limited. The upper coupling switch 851 cannot bring about triggering of the fuses F3 of the lower coupling switch 852 via the VLANs V1 and V2 since these are not passed on through by the control computers 811-814.

Alternatively, it would be possible to dispense with the VLANs V3 and V4, as a result of which there would no longer be disjunctive paths between all the control computers 811-814, which could be tolerated given suitable distribution of the control functions among the control computers 811-804. Data packets would not have to be passed through the control computer segments 703, 704 for this.

Case 4:

The upper coupling switch 851 babbles with a bandwidth of more than 50%: the fuse F5 of the node 841 therefore triggers. The nodes 821 and 831 are disconnected from the rest of the communications network 102. The fuses F4 and F5 of the lower coupling switch 852 do not trigger since the upper coupling switch 852 can babble only on the VLAN V1, but these data packets are not accepted by the lower coupling switch 852.

The fuses F2 of the control computers 811, 812 trigger. No babbled traffic penetrates the inner ring composed of the segments 703, 704.

Figure 8:
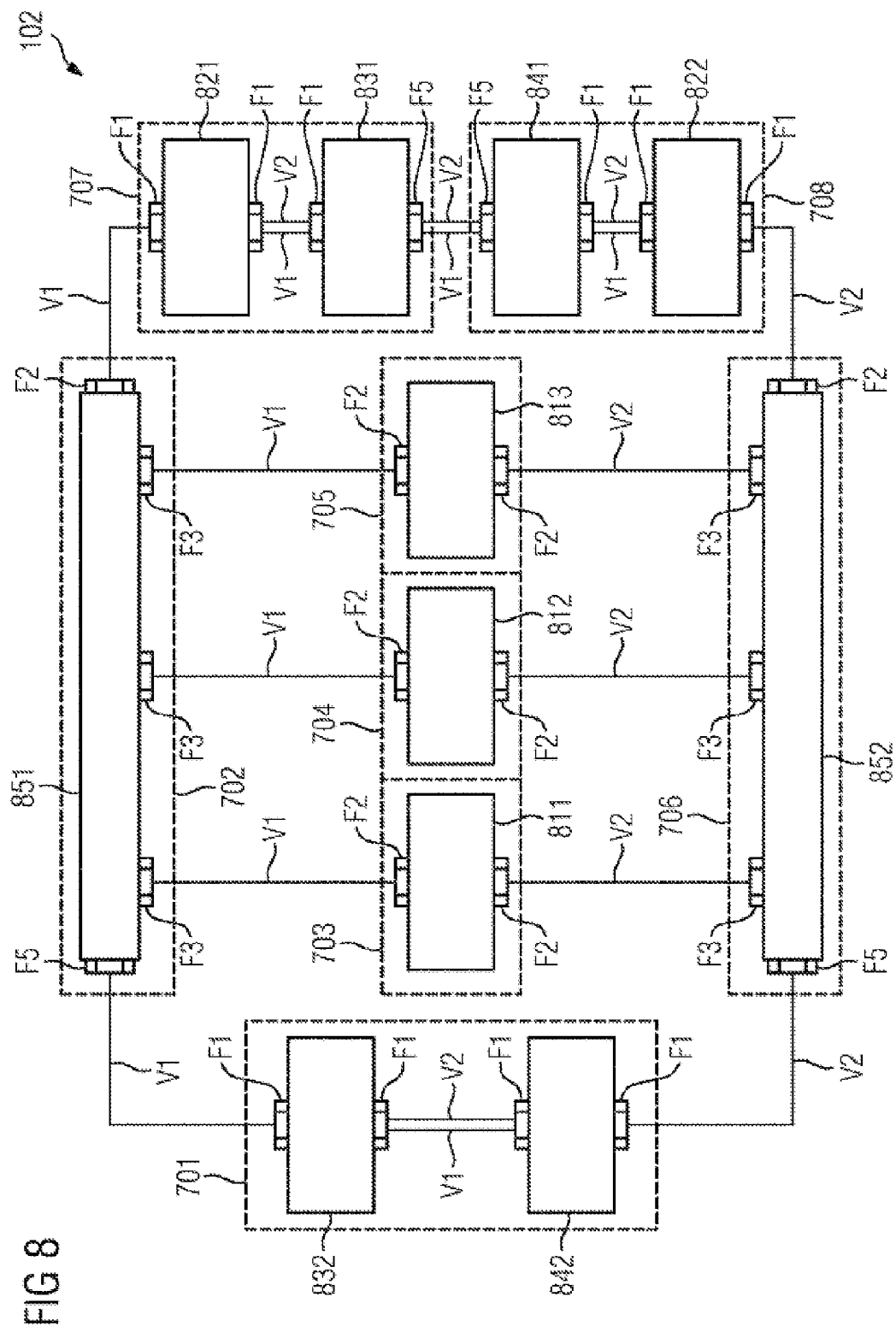
FIG. 8 shows a schematic illustration of a sixth embodiment of a network arrangement.

FIG. 8 shows a schematic illustration of a sixth embodiment of a network arrangement 102. The exemplary embodiment in FIG. 8 differs from the exemplary embodiment in FIG. 7 in particular in the network topology. In particular, in the embodiment in FIG. 8 only two VLANs V1, V2 are implemented. As a result of the two VLANs V1, V2 a packet which has been fed into the outer ring via one of the coupling switches 851, 852 can never leave this ring again through the other coupling switch 852, 851. This data packet is therefore not passed through the outer ring. In order, nevertheless, to permit two disjunctive paths between all the nodes of the communications network 102, the two VLANs V1, V2 which are described are used.

The function of the fuses F1-F5 can be clarified by the following three examples:

The first example is based on the assumption that the node 822 is the Babbling Idiot. In this first example four cases can be differentiated:

Case 1:
The node 822 babbles with a bandwidth of up to 9%–ε: this babbling with a low bandwidth is not detected by any fuse F1-F5. The node 841 also adds its planned bandwidth, for example 1%, to the data packets which the node 822 sends upward. Nevertheless, a threshold value of a fuse F1-F5 is not exceeded. The 9% bandwidth which is used does not bring about any adverse effect on the entire system of the network arrangement 102.

Case 2:
The node 822 babbles with a bandwidth of 9%+ε up to 20%–ε: the node 841 adds its planned portion of 1%, and the fuse F5 at the node 831 triggers. The node 822 is to be assumed to be defective, and the node 841 is not defective but is disconnected from the communication and is therefore lost. The connection via the path V1 is interrupted by the fuse F5 and the connection via the path V2 is interrupted by the defective node 822.

Case 3:
The node 822 babbles with a bandwidth of 20% to 80%–ε: in addition to the fuse F5, the fuse F4 at the lower coupling switch 852 triggers. The segment 708 from the nodes 822 and 841 is disconnected from the communication, and the rest of the communications network 102 is not adversely affected. Only the redundancy in the right-hand outer ring is lost.

Case 4:
The node 822 babbles with a bandwidth of more than 80%: the fuse F4 of the lower coupling switch 852 and the fuse F1 at the node 841 trigger. Only the node 822 is then disconnected from the communication and the rest of the communications network 102 is not adversely affected. Only the redundancy in the right-hand outer ring is lost. However, the node 841 is not lost.

In the following second example it is assumed that the control computer 811 is the Babbling Idiot. Here, two cases can be differentiated:

Case 1:
The control computer 811 babbles with a bandwidth of up to 35%–ε. The fuses F3 at the coupling switches 851, 852 do not trigger. Possibly one or both of the fuses F5 between the nodes 831 and 841 trigger since here the lower permissible bandwidth (10%) is set. This effect is undesired but does not bring about the loss of a node.

The fuses which could disconnect the outer rings from the coupling switch 841 lying opposite do not trigger since the data packets which are transmitted to the outer ring must be associated with the VLAN V1 or the VLAN V2. Data packets which have been transmitted via a coupling switch 851, 852 are not received by the other coupling switch 852, 851 under any circumstances since said other coupling switch 852, 851 is always associated with the other VLAN V2, V1. Therefore, no nodes and no control computer 811-813 are excluded from the communication.

Case 2:
The control computer 811 babbles with a bandwidth of more than 35%: the fuses F3 of the coupling switches 851, 852 which are coupled to the control computer 811 trigger. The control computer 811 is therefore disconnected from the communications network 102. However, all the other nodes continue to be connected in a redundant fashion.

The following third example is based on the assumption that the upper coupling switch 851 is the Babbling Idiot: in this example three cases can be differentiated:

Case 1:
The upper coupling switch 851 babbles with a bandwidth of less than 8%. The nodes 821 and 833 add their planned bandwidth, for example 1% each. The fuse F5 at the node 841 therefore does not trigger. The fuses F2 and F1 of the lower coupling switch 852 do not trigger either since the upper coupling switch can babble only on the VLAN V1 but these data packets are not accepted by the lower coupling switch 852. The fuses F3 of the lower coupling switch 852 do not trigger either since data packets of the VLAN V1 are not passed on by the control computers 811-813 to the lower coupling switch 852. All the nodes therefore continue to be connected to one another via the VLAN V2.

Case 2:
The upper coupling switch 851 babbles with a bandwidth of 8% to 50%–ε: the nodes 821 and 831 add their planned bandwidth. The fuse F5 of the node 841 triggers. The nodes 821 and 831 are therefore disconnected from the rest of the communications network 102. The fuses F2 and F1 of the lower coupling switch 852 do not trigger since the upper coupling switch 815 can babble only on the VLAN V1, but these data packets are not accepted by the lower coupling switch 852. The fuses F3 of the lower coupling switch 852 do not trigger either since data packets of the VLAN V1 are not passed on to the lower coupling switch 852 by the control computers 811-813.

Case 3:
The upper coupling switch 851 babbles with a bandwidth of more than 50%: the fuses F2 at the nodes 821 and 832 trigger. Furthermore, the fuses F2 of the control computers 811-813 also trigger. The upper coupling switch 851 is therefore disconnected from the communications network 102. However, all the nodes continue to be connected to one another in a non-redundant fashion via the VLAN V2. In this context, the coupling switches 851, 852 are not considered to be nodes.

FIG. 9 shows a schematic illustration of a seventh embodiment of a network arrangement 102.

The fuses F1-F5 prevent a Babbling Idiot from being able to flood one or more of the rings of the network arrangement 102 with meaningless data. For this purpose, the fuses F1-F5 monitor the, in particular, incoming high-priority data traffic at the outer connections of the platform computer 811-814, i.e. at the outer ring links of the control computers 811-814.

Babbling Idiots in the outer rings composed of the segments 701, 704, 705 therefore cannot disrupt the communication in the inner ring composed of the segments 702, 703. If redundant and network devices which are highly available at least in terms of communication, for example assemblies, are installed in an outer ring, fuses F1-F5 must also be provided between them in both directions. An example of this are the fuses F5 of the network devices 831 and 822.

The links of the inner ring of the segments 702, 703, which connect the control computers 811 to 814 to various power supplies, are also monitored. Therefore, for example, the control computers 811 and 812 are supplied by means of a first power supply, while the control computers 813 and 814 are supplied by means of a second power supply. Overall, the first power supply supplies the network devices

811, 812, 821, 831, 822, and the second power supply supplies the network devices 823, 824, 813, 814, 832. As a result, a babbling control computer can at worst adversely affect the control computer with the same power supply, that is to say bring about a state which is comparable to the failure of a power supply. The second power supply, and therefore the network devices connected thereto, remain unaffected by this.

The critical traffic which passes through these links can be determined manually or by a configuration mechanism. In this case, the maximum permissible bandwidth in the fuses F1-F5 is to be set with a defined margin which can be estimated conservatively at 100%, for example. The sum of the planned traffic in the inner ring, formed by the segments 702 and 703, and the maximum traffic penetrating the inner ring through the outer ring port must not exceed the value set for the fuses F2 (F2=50%) between the control computers 811-814, since otherwise the traffic coming from outside could interrupt the communication in the inner ring. For example, a bandwidth of 25% is planned from the control computer 811 to the control computer 812 in FIG. 9. The fuse F4 of the control computer 812 permits at maximum 20% to penetrate from the outer ring, that is to say the fuse F2 of the control computer 814 must permit at least 25%+20% load. In the example in FIG. 9, 50% is set for the fuse F2 of the control computer 814 taking into account a safety margin.

In addition, the fuses F3-F5 (F3=35%, F4=20%, F5=10%) limit the bandwidth to a significantly higher value than the fuses F1 and F2 (F2=80%, F2=50%). If a Babbling Idiot babbles with a very high bandwidth, it is therefore isolated locally and does not adversely affect the functioning of other network devices. The functioning of the fuses F1-F5 in the embodiment in FIG. 9 is explained below by means of two examples:

In a first example it is assumed that the network device 832 is the Babbling Idiot:

Here, four cases are differentiated:

Case 1:
The network device 832 babbles with a bandwidth of up to 9%: this babbling with a low bandwidth is not detected by any of the fuses F1-F5. The wasted 8% bandwidth brings about no adverse effect on the entire system of the network arrangement 102.

Case 2:
The network device 832 babbles with a bandwidth of 9%+ε up to 20%−ε. The network device 822 of the same segment 705 adds its planned portion of 1%. The fuse F5 of the network device 831 therefore triggers. The fuse F4 at the outer ring port of the control computer 814 does not trigger yet. The network device 832 is therefore to be assumed to be defective. In contrast, the network device 822 is not defective but is disconnected from the communication with the control computers 811 to 814 and therefore lost. The connection via the path V1 is interrupted by the fuse F5, and the connection via the path V2 is disconnected by the defective network device 832. Therefore, the network device 832 wastes up to 20% bandwidth at the cost of the non-critical traffic.

Case 3:
The network device 832 babbles with a bandwidth of 20% to 80%−ε: in addition to the fuse F5 of the network device 831 the fuse F4 of the control computer 814 at the outer ring port of the control computer 814 triggers. The network device 832 and the network device 822 are disconnected from the communication. The rest of the communications network 102 is not adversely affected. Only the redundancy through the network segment 705 is therefore lost.

Case 4:
The network device 832 babbles with a bandwidth of more than 80%. The fuse F4 of the control computer 814 and the fuse F5 at the network device 822 trigger. The network device 832 is therefore disconnected from the communication but the rest of the communications network 102 is not adversely affected. Only the redundancy in the right-hand outer ring is lost. The network device 822 is not lost either in this case 4.

The second example is based on the assumption that the control computer 811 is the Babbling Idiot. Here, three cases can be differentiated:

Case 1:
The control computer 811 babbles with a low bandwidth. One of the fuses F5 between the network devices 831 and 822 possibly triggers, since here a low permissible bandwidth (F5=10%) is set. This effect is undesired but does not lead to the loss of a network device but instead only to the loss of the redundancy in the right-hand outer ring composed of the segments 704 and 705. The fuses which could separate the outer rings from the outer ring port F5 of the control computer lying opposite do not trigger, since the packets transmitted on to the outer ring have to be associated with the VLAN V1 or the VLAN V2. Data packets which are transmitted by the one control computer 811 are not received by the other control computer 813 under any circumstances, since the other control computer 813 is always associated with the other VLAN V2, V1. No network device and no control computer is therefore excluded from the communication and the wasted bandwidth is at the cost of the non-critical traffic.

Case 2:
The control computer 811 babbles with a relatively high bandwidth of up to 80%−ε: depending on the VLAN V1-V4 on which the control computer 811 babbles, and on other traffic, the fuses F2 of the control computers 812, 813, 814 trigger. In this context, the two following secondary cases i) and ii) are to be differentiated:

Secondary case i): Only the fuse F2 of the control computer 813 triggers: the control computers 812, 813, 814 are connected in a non-redundant fashion and the right-hand outer ring composed of the segments 704 and 705 is connected in a redundant fashion. The left-hand outer ring composed of the segment 701 is connected in a non-redundant fashion. Up to 50% of the bandwidth can be lost on the VLAN V1 or the VLAN V3. The VLAN V2 is functionally capable and connects the control computers 812, 813, 814 to the network devices of the outer rings.

Secondary case ii): The fuse F2 of the control computer 813 and additionally the fuse F2 of the control computer 812 and/or the fuse F2 of the control computer 814 trigger: the control computer 812 which is actually functionally capable is disconnected from the inner ring. The control computers 813 and 814 continue to be connected to all the network devices of the outer rings in a non-redundant fashion. In the most unfavorable case, 50% of the bandwidth is wasted.

Case 3:
The control computer 811 babbles with a bandwidth of more than 80%: the fuse F2 of the control computer 813 and the fuse F1 of the control computer 812 trigger. The defective control computer 811 is excluded from the communication. All the other control computers 812-814 and the network devices of the outer rings are connected at least in a non-redundant fashion, and the right-hand outer ring composed of the segments 704, 705 is even connected in a redundant fashion. The full bandwidth is available here because the Babbling Idiot, here the control computer 811, is isolated.

Although the invention has been illustrated and described in detail by means of the preferred exemplary embodiment, the invention is not restricted by the disclosed examples and other variations can be derived therefrom by a person skilled in the art without departing from the scope of protection of the invention. In particular, embodiments of the network arrangement can have further network-capable elements which can also constitute a Babbling Idiot.

The invention claimed is:

1. A method for fault checking a communications network for network devices which are coupled to the communications network, wherein a respective network device comprises a first and a second control device, wherein the first control device is coupled to a first switch device and the second control device is coupled to a second switch device, and wherein the first and second switch devices have in each case a reception port and a transmission port for transmitting and receiving data via the communications network, and the reception port is assigned a fuse device for disconnecting data reception, wherein the method comprises:
predefining a maximum data transmission rate during the transmission of data, wherein the network devices are configured to transmit data at a data rate which is lower than the predefined maximum data transmission rate;
monitoring a data transmission rate of received data at the reception ports of the network devices for a fault;
generating first data items by the first control device and second data items by the second control device, wherein the first data items and the second data items are linked to one another by predefined coding;
transmitting the first data items from the first control device to the second control device via the first switch device and transmitting the second data items from the second control device to the first control device via the second switch device;
transmitting the first data items and the second data items via a first communication path from the transmission port of the first switch device for the first control device to the reception port of the second switch device for the second control device;
transmitting the first data items and the second data items via a second communication path from the transmission port of the second switch device for the second control device to the reception port of the first switch device for the first control device;
wherein the data items of the first and second communication paths pass through the network devices in opposite directions;
disconnecting at least one communication path of the first communication path and the second communication path data reception if incoming data has a fault as defined by a data transmission rate which is higher than the predefined maximum data transmission rate; and
allowing for data transmission via one of the first and second communication paths which does not have a fault.

2. The method as claimed in claim 1, further comprising: releasing the data reception at the reception port if incoming data has a data transmission rate which is lower than the predefined maximum data transmission rate.

3. The method as claimed in claim 1, wherein a maximum link transmission rate is predefined for each communication path between the transmission port and the reception port.

4. The method as claimed in claim 1, wherein the data is assigned at least two priority classes and the data transmission rate is monitored exclusively for data of a selected priority class and data reception is blocked depending upon detection of the priority class.

5. The method as claimed in claim 1, wherein the data is assigned at least two priority classes, and in order to estimate the data transmission rate for data of a selected priority class a waiting time for the data of the selected priority class is detected in the at least first or second switch device.

6. The method as claimed in claim 1, also comprising:
transmitting the first data items and the second data items via the transmission port of the first switch device for the first control device to the reception port of the second switch device for the second control device via at least one further switch device of a further network device with a first and a second control device; and
transmitting the first data items and the second data items via the transmission port of the second switch device for the second control device to the reception port of the first switch device for the first control device via at least one further switch device of a further network device with a first and a second control device;
wherein in a respective further switch device data received at a reception port for the second control device of the further switch device is passed on to a transmission port for the first control device of the further switch device, and data received at a reception port for the first control device of the further switch device is passed on to a transmission port for the second control device of the further switch device.

7. The method as claimed in claim 1, also comprising: comparing the first data items with the second data items in order to generate a comparison result; and passivizing the network device as a function of the comparison result.

8. The method as claimed in claim 1, also comprising: receiving the first data items and the second data items at input ports for different control devices in the further network device, and comparing the received data items.

9. The method as claimed in claim 1, wherein the communications network is an Ethernet network.

10. The method as claimed in claim 1, wherein the fuse devices of at least two network devices are assigned various threshold values for the data transmission rate, wherein each of the various threshold values is lower than or equal to the predefined maximum data transmission rate, wherein data reception at the reception port of the at least two network devices is blocked if the data incoming at the assigned reception port has the data transmission rate which is higher than the assigned threshold value.

11. The method as claimed in claim 10, wherein the network devices are arranged distributed in a multiplicity of network segments, wherein each of the network segments is assigned a subset of the network devices, wherein at each network segment with at least two assigned network devices the fuse device which is arranged at an edge region of the network segment is assigned a lower threshold value for the data transmission rate than in the case of a fuse device which is arranged in a middle region of the network segment.

12. The method as claimed in claim 11, wherein the subsets are formed as disjunctive subsets.

13. The method as claimed in claim 10, wherein the network devices comprise at least two network devices which are redundant with respect to their functionality, wherein the subsets are formed in such a way that each of the subsets is assigned one of the redundant network devices at most.

14. The method as claimed in claim 11, wherein a multiplicity of virtual networks are implemented in the communications network in order to avoid the threshold value for the data transmission rate being exceeded at the fuse device of a network segment owing to reception of data from another network segment.

15. The method as claimed in claim 14, wherein the respective threshold value for the data transmission rate of the respective fuse device is set as a function of the virtual network in which the respective fuse device is arranged.

16. A computer program product, comprising a computer readable hardware storage device having computer readable program code stored therein, said program code executable by a processor of a computer system to implement the method as claimed in claim 1 on one or more program-controlled devices.

17. A data carrier having a stored computer program with instructions, comprising a computer readable hardware storage device having computer readable program code stored therein, said program code executable by a processor of a computer system to implement the method as claimed in claim 1 on one or more program-controlled devices.

18. A network arrangement having a plurality of network devices which are coupled to a communications network, wherein a respective network device has a first switch device and a first control device, which is coupled to the first switch device, and wherein the first switch device has a reception port and a transmission port for transmitting and receiving data via the communications network, and having at least one fuse device, assigned to the reception port, for disconnecting data reception, wherein the network devices are configured to carry out a method as claimed in claim 1.

19. The network arrangement as claimed in claim 18, wherein at least one of the network devices and the fuse devices are each embodied as a single FPGA, ASIC, IC chip or hard-wired microcircuit.

* * * * *